United States Patent
Dai et al.

(10) Patent No.: US 9,130,718 B2
(45) Date of Patent: Sep. 8, 2015

(54) METHOD FOR SENDING PHYSICAL DOWNLINK CONTROL CHANNEL SIGNALS IN DOWNLINK PILOT TIME SLOT

(75) Inventors: Bo Dai, Shenzhen (CN); Shuqiang Xia, Shenzhen (CN); Peng Hao, Shenzhen (CN); Chunli Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1146 days.

(21) Appl. No.: 12/811,520

(22) PCT Filed: Dec. 4, 2008

(86) PCT No.: PCT/CN2008/073335
§ 371 (c)(1),
(2), (4) Date: Jul. 2, 2010

(87) PCT Pub. No.: WO2009/094880
PCT Pub. Date: Aug. 6, 2009

(65) Prior Publication Data
US 2010/0290376 A1    Nov. 18, 2010

(30) Foreign Application Priority Data

Jan. 28, 2008  (CN) .......................... 2008 1 0003996

(51) Int. Cl.
*H04L 5/00* (2006.01)
*H04L 5/14* (2006.01)
*H04W 72/14* (2009.01)

(52) U.S. Cl.
CPC ............ *H04L 5/0053* (2013.01); *H04L 5/0007* (2013.01); *H04L 5/0048* (2013.01); *H04L 5/14* (2013.01); *H04W 72/14* (2013.01)

(58) Field of Classification Search
None
See application file for complete search history.

(56) References Cited

U.S. PATENT DOCUMENTS

| 6,567,383 | B1 | 5/2003 | Bohnke |
| 6,807,147 | B1 | 10/2004 | Heinonen et al. |
| 2009/0180435 | A1* | 7/2009 | Sarkar ........................... 370/330 |

FOREIGN PATENT DOCUMENTS

| CN | 1450742 A | 10/2003 |
| CN | 101005307 A | 7/2007 |
| CN | 101035371 A | 9/2007 |
| CN | 101222272 A | 7/2008 |
| KR | 20040019038 A | 3/2004 |
| RU | 2005141504 A | 8/2006 |
| WO | 2006021145 A1 | 3/2006 |

OTHER PUBLICATIONS

Ericsson, "Usage of DwPTS" Jan. 14-18, 2008.*

(Continued)

*Primary Examiner* — Faruk Hamza
*Assistant Examiner* — Tito Pham
(74) *Attorney, Agent, or Firm* — Oppedahl Patent Law Firm LLC

(57) ABSTRACT

A method for sending physical downlink control channel (PDCCH) signals in downlink pilot time slots (DwPTS) comprises: a base station (BS) transmits the PDCCH signals on one or more symbols in the DwPTS, and resources used for transmitting the PDCCH signals are different from resources used for transmitting primary synchronization signals of synchronization signals. In the present invention, the method for sending the PDCCH signals can solve the problem of conflict between the PDCCH and the primary synchronization signals in the DwPTS by generating a less delay and less impact on other channels.

2 Claims, 6 Drawing Sheets

(56) References Cited

OTHER PUBLICATIONS

Downlink Control Signaling for TDD Jan. 14-18, 2008.
Physical control format indicator channel Nov. 2007.
Usage of resources in special subframe for FS2, R1-080174.
Usage of DwPTS, RI-080347, 3GPP TSG RAN WG1.
Way Forward on LTE TDD frame structure.
Supplementary European Search Report in European application No. 08871852.3, mailed on Aug. 8, 2011.
International Search Report in international application No. PCT/CN2008/073335, mailed Mar. 12, 2009.
English Translation of the Written Opinion of the International Search Authority in international application No. PCT/CN2008/073335, mailed Mar. 12, 2009.

* cited by examiner

METHOD FOR SENDING PHYSICAL DOWNLINK CONTROL CHANNEL SIGNALS IN DOWNLINK PILOT TIME SLOT

TECHNICAL FIELD

The present invention relates to the filed of communications, and specifically to a method for sending physical downlink control channel (PDCCH) signals in downlink pilot time slots (DwPTS).

BACKGROUND

A frame structure of TDD (time division duplex) mode in an LTE (long term evolution) system is as shown in FIG. 1. In this frame structure, one radio frame of length 10 ms is divided into two half-frames, each half-frame is divided into 10 time slots with a length of 0.5 ms respectively, two time slots constitute one subframe with a length of 1 ms, one radio frame contains 10 subframes (numbered from 0 to 9), and one radio frame contains 20 time slots (numbered from 0 to 19). For a normal cyclic prefix (CP) with a length of 5.21 us and 4.69 us, one time slot contains 7 uplink/downlink symbols with a length of 66.7 us, wherein the length of the cyclic prefix of the first symbol is 5.21 us, and the length of the cyclic prefix of the other 6 symbols is 4.69 us respectively; for an extended cyclic prefix with a length of 16.67 us, one time slot contains 6 uplink/downlink symbols. Moreover, in this frame structure, the configuration characteristic of the subframe is that:

(1) subframe 0 and subframe 5 are fixedly used for downlink transmission;

(2) support uplink/downlink switch in the periods of 5 ms and 10 ms;

(3) subframe 1 and subframe 6 are special subframes that are used for transmitting 3 special time slots, i.e. a downlink pilot time slot (DwPTS), a guard period (GP) and an uplink pilot time slot (UpPTS); wherein, the DwPTS is used for downlink transmission;

the GP is guard time, without transmitting any data; and the UpPTS is used for uplink transmission, and at least contains 2 uplink single carrier-frequency division multiple access (SC-FDMA) symbols used for transmitting a physical random access channel (PRACH);

(4) subframe 2 and subframe 7 are fixedly used for uplink transmission during uplink/downlink switch in the period of 5 ms;

(5) during uplink/downlink switch in the period of 10 ms, the DwPTS exists in two half-frames, the GP and the UpPTS exist in the first half-frame, the duration of the DwPTS in the second half-frame is 1 ms, the subframe 2 is used for uplink transmission, and the subframe 7 to subframe 9 are used for downlink transmission;

(6) primary synchronization (P-SCH) signals are transmitted on the first orthogonal frequency division multiplexing (OFDM) symbol in the DwPTS; secondary synchronization (S-SCH) signals are transmitted on the last OFDM symbol in time slot 1 and time slot 11, and the bandwidth in the frequency domain is 1.08 MHz; and (7) at present, it is specified that the number of OFDM symbols contained in the DwPTS is at least 3.

A physical control format indicator channel (PCFICH) is transmitted on the first OFDM symbol in a common subframe.

A physical downlink control channel (PDCCH) is transmitted on the first n OFDM symbol(s) in the common subframe, and the n can be 1, 2, 3. Wherein, the value of the n is designated by the physical control format indicator channel.

Since the primary synchronization signals are transmitted on the first OFDM symbol in the DwPTS, in this way, for smaller bandwidths such as 1.25 MHz, the physical downlink control channel can not be transmitted on the first OFDM symbol in the DwPTS; therefore, the present invention provides a scheme to solve the problem of conflict between the primary synchronization signals and the physical downlink control channel in the DwPTS.

SUMMARY

The technical problem that the present invention intends to resolve is to provide a method for sending the PDCCH signals in the downlink pilot time slots (DwPTS), which can solve the problem of conflict between the physical downlink control channel and primary synchronization signals in the DwPTS.

In order to resolve the above-mentioned problem, the present invention provides a method for sending the PDCCH signals in the downlink pilot time slots (DwPTS), which comprises: a base station (BS) transmits the PDCCH signals on one or more symbols in the DwPTS, and the resources used for transmitting the PDCCH signals are different from the resources used for transmitting primary synchronization signals of synchronization signals.

Furthermore, the method for sending signals also has the following characteristics:

the method for sending signals may be applied in a long term evolution system that is based on a time division duplex mode; in a frame structure of the system, one radio frame of length 10 ms may be divided into two half-frames, each half-frame may be divided into 10 time slots with a length of 0.5 ms respectively, two time slots may constitute one subframe with a length of 1 ms, one radio frame may contain 10 subframes that are numbered from 0 to 9, one radio frame may contain 20 time slots that are numbered from 0 to 19, and the downlink pilot time slot may be located in subframe 1 and subframe 6.

Furthermore, the method for sending signals also has the following characteristics:

the symbol contained in the time slot may be an orthogonal frequency division multiplexing symbol.

Furthermore, the method for sending signals also has the following characteristics:

the BS may transmit the primary synchronization signals on the first symbol in the downlink pilot time slot;

when the number of symbols used for transmitting the physical downlink control channel is 1, the BS may transmit the PDCCH signals on the second symbol in the downlink pilot time slot;

when the number of symbols used for transmitting the physical downlink control channel is 2, the BS may transmit the PDCCH signals on the second symbol and the third symbol in the downlink pilot time slot; and when the number of symbols used for transmitting the physical downlink control channel is 3, the BS may transmit the PDCCH signals on the second symbol, the third symbol and the fourth symbol in the downlink pilot time slot.

Furthermore, the method for sending signals also has the following characteristics:

the BS may transmit the primary synchronization signals on the first symbol in the downlink pilot time slot;

when the number of symbols used for transmitting the physical downlink control channel is 1, the BS may transmit the PDCCH signals on the second symbol in the downlink pilot time slot;

when the number of symbols used for transmitting the physical downlink control channel is 2, the BS may transmit the PDCCH signals on the second symbol and the third symbol in the downlink pilot time slot; and when the number of symbols used for transmitting the physical downlink control channel is 3, the BS may transmit the PDCCH signals on the first symbol, the second symbol and the third symbol in the downlink pilot time slot, and the primary synchronization signals and the PDCCH signals may be transmitted in different subcarriers on the first symbol in the downlink pilot time slot.

Furthermore, the method for sending signals also has the following characteristics:

the BS may transmit the primary synchronization signals on the first symbol in the downlink pilot time slot;

when the number of symbols used for transmitting the physical downlink control channel is 1, the BS may transmit the PDCCH signals on the second symbol in the downlink pilot time slot;

when the number of symbols used for transmitting the physical downlink control channel is 2, the BS may transmit the PDCCH signals on the first symbol and the second symbol in the downlink pilot time slot, and the primary synchronization signals and the PDCCH signals may be transmitted in different subcarriers on the first symbol in the downlink pilot time slot; and when the number of symbols used for transmitting the physical downlink control channel is 3, the BS may transmit the PDCCH signals on the first symbol, the second symbol and the third symbol in the downlink pilot time slot, and the primary synchronization signals and the PDCCH signals may be transmitted in different subcarriers on the first symbol in the downlink pilot time slot.

Furthermore, the method for sending signals also has the following characteristics:

the BS may transmit the primary synchronization signals on the first symbol in the downlink pilot time slot; when the ratio of uplink time slot to the downlink time slot is 3:1 and the number of symbols contained in the downlink pilot time slot is greater than 3, the physical downlink control channel in the downlink pilot time slot may be mapped to the first four symbols or the second, third, fourth and fifth symbols in the downlink pilot time slot to be transmitted by the BS.

Furthermore, the method for sending signals also has the following characteristics:

when the number of symbols used for transmitting the physical downlink control channel is n, the BS may transmit the PDCCH signals on the first n symbol(s) in the downlink pilot time slot; moreover, the BS may transmit the primary synchronization signals of the synchronization signals on the third symbol in the downlink pilot time slot, and may transmit secondary synchronization signals of the synchronization signals on the last symbols in time slot 1 and time slot 11.

Furthermore, the method for sending signals also has the following characteristics:

when the number of symbols used for transmitting the physical downlink control channel is n, the BS may transmit the PDCCH signals on the first n symbol(s) in the downlink pilot time slot; and the BS may transmit the primary synchronization signals of the synchronization signals on the last symbols in time slot 1 and time slot 11, and may transmit secondary synchronization signals of the synchronization signals on the penultimate symbols in time slot 1 and time slot 11.

Furthermore, the method for sending signals also has the following characteristics:

when the ratio of uplink time slot to the downlink time slot is 3:1, the number of symbols used by the base station for transmitting the physical downlink control channel in the downlink pilot time slot may be 4, while under other circumstances, the number of symbols used for transmitting the physical downlink control channel in the downlink pilot time slot may be 1, 2 or 3, which is designated by a physical control format indicator channel.

The advantage of the method for sending the PDCCH signals in the present invention is that it can solve the problem of conflict between the PDCCH and the primary synchronization signals in the DwPTS by generating a less delay and less impact on other channels.

In the above figures, "▩▩▩" stands for the resources in OFDM symbols used for transmitting the PDCCH signals.

DETAILED DESCRIPTION

In order to gain a deeper insight into the present invention, some specific embodiments comprising the method of the present invention are provided below with reference to FIG. 2-FIG. 6.

Figure 1:
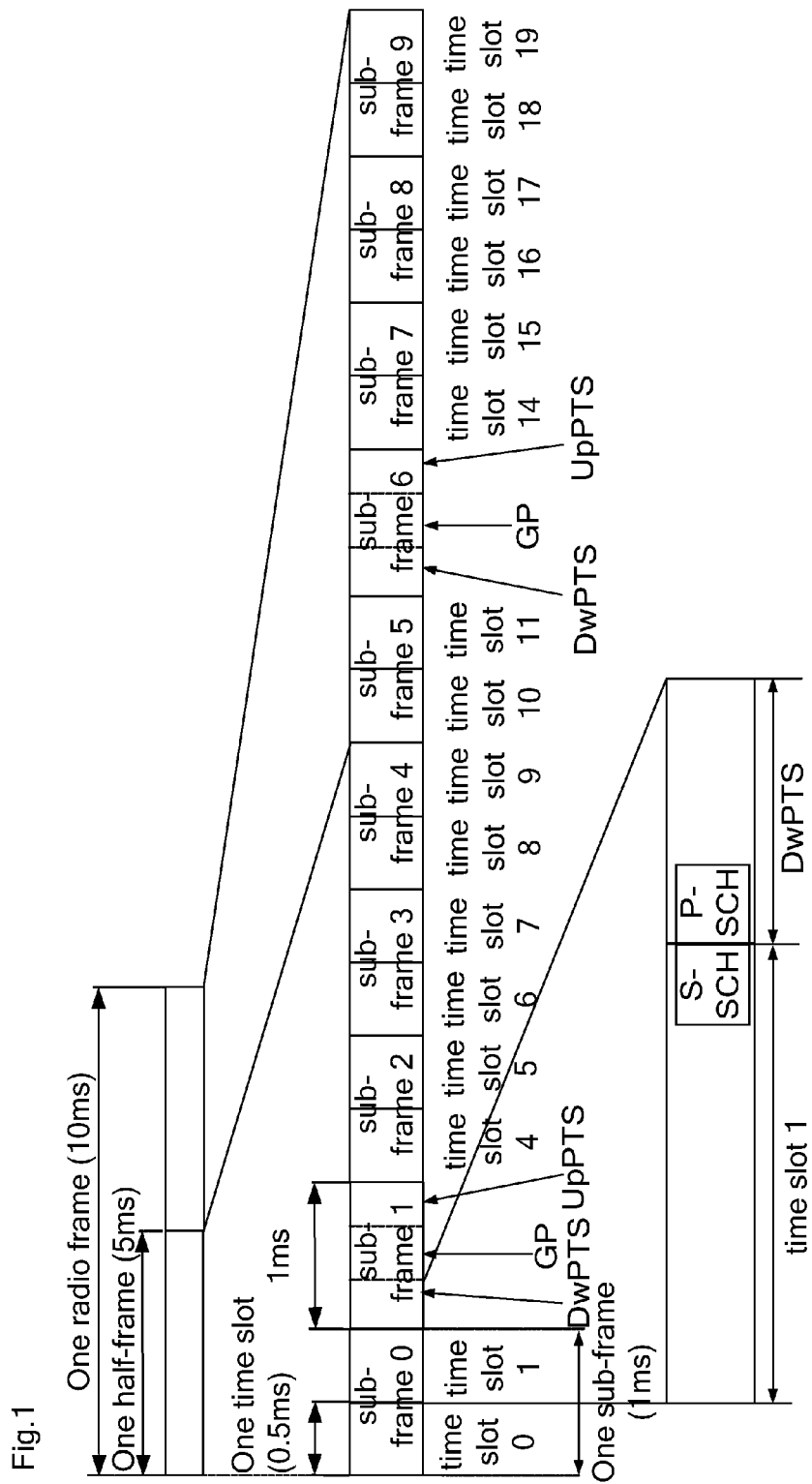
FIG. 1 is a schematic illustration of the frame structure as described in the present invention.
Figure 2:
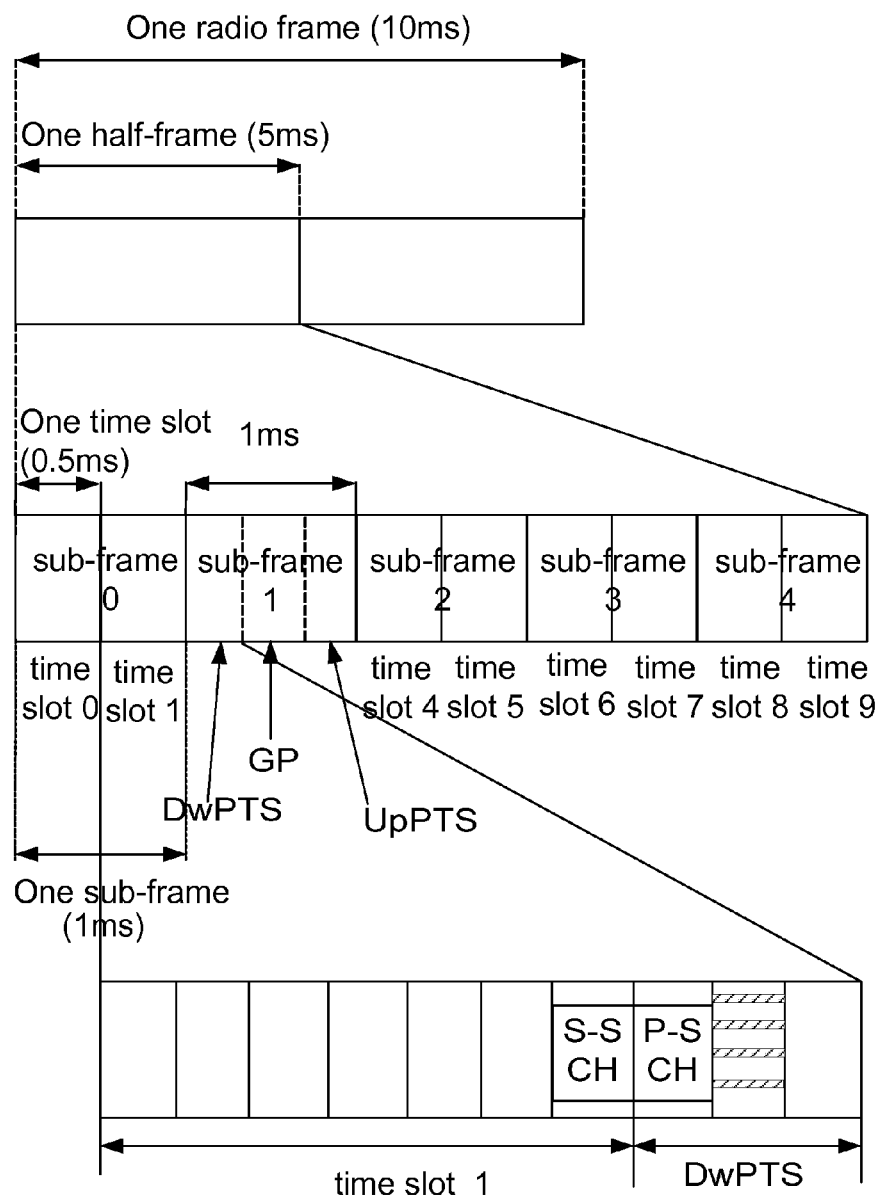
FIG. 2 is a specific embodiment of the physical downlink control channel in the present invention.

FIG. 2 is a specific embodiment of sending the PDCCH signals in the present invention. In an LTE system, one radio frame of length 10 ms is divided into two half-frames, each half-frame is divided into 10 time slots with a length of 0.5 ms respectively, two time slots constitute one subframe with a length of 1 ms, one radio frame contains 10 subframes (numbered from 0 to 9), and one radio frame contains 20 time slots (numbered from 0 to 19). In a normal cyclic prefix, one subframe contains 14 orthogonal frequency division multiplexing (OFDM) symbols; suppose that a DwPTS contains 3 OFDM symbols, then the uplink/downlink switch period is 5 ms. A base station (BS) transmits primary synchronization signals on the first OFDM symbol in the DwPTS; the number of the OFDM symbols used for transmitting the PDCCH signals is 1, and the BS transmits the PDCCH signals on the second OFDM symbol in the DwPTS.

Figure 3:
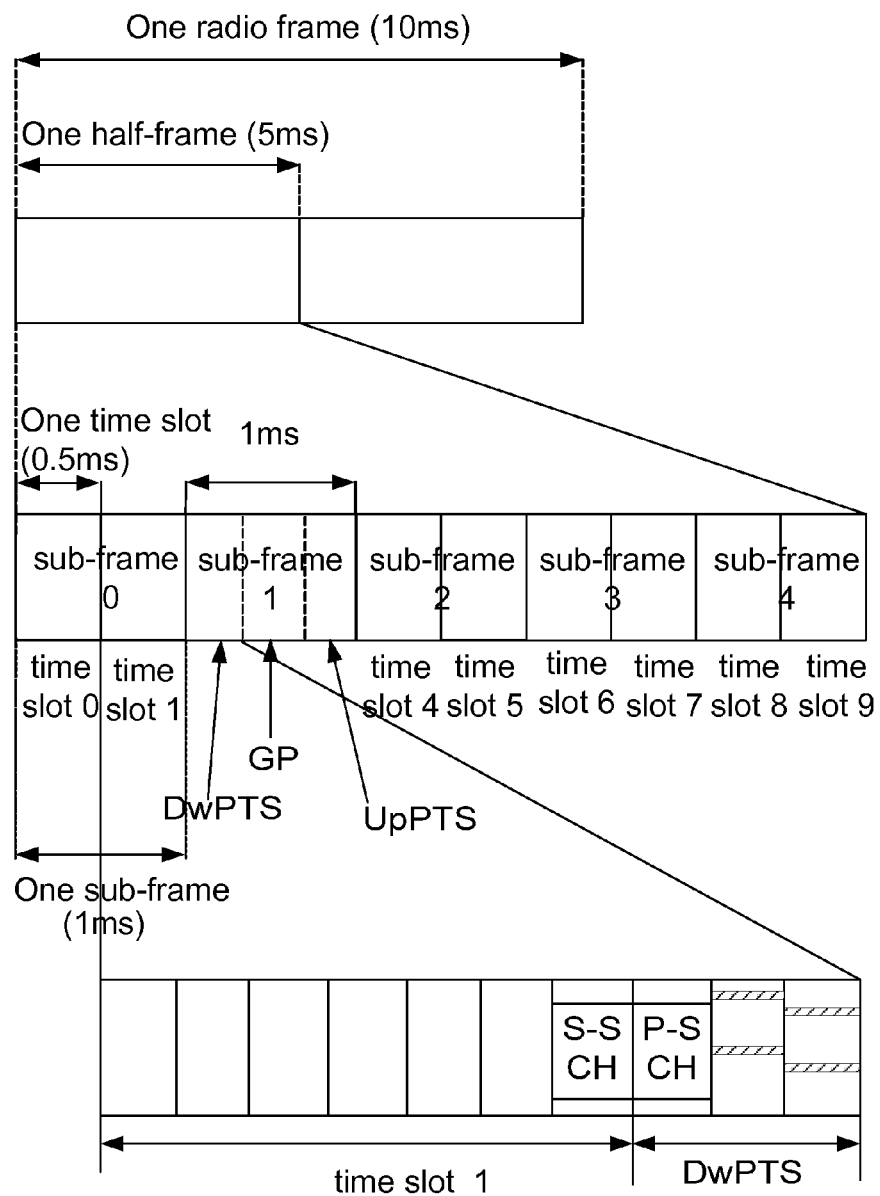
FIG. 3 is another specific embodiment of the physical downlink control channel in the present invention.

FIG. 3 is another specific embodiment of sending the PDCCH signals in the present invention. In the LTE system, one radio frame of length 10 ms is divided into two half-frames, each half-frame is divided into 10 time slots with a length of 0.5 ms respectively, two time slots constitute one subframe with a length of 1 ms, one radio frame contains 10 subframes (numbered from 0 to 9), and one radio frame contains 20 time slots (numbered from 0 to 19). In the normal cyclic prefix, one subframe contains 14 OFDM symbols; suppose that the DwPTS contains 3 OFDM symbols, the uplink/downlink switch period is 5 ms, the BS transmits the primary synchronization signals on the first OFDM symbol in the DwPTS, the number of the OFDM symbols used for transmitting the PDCCH signals is 2, and the BS transmits the PDCCH signals on the second OFDM symbol and the third OFDM symbol in the DwPTS.

Figure 4:
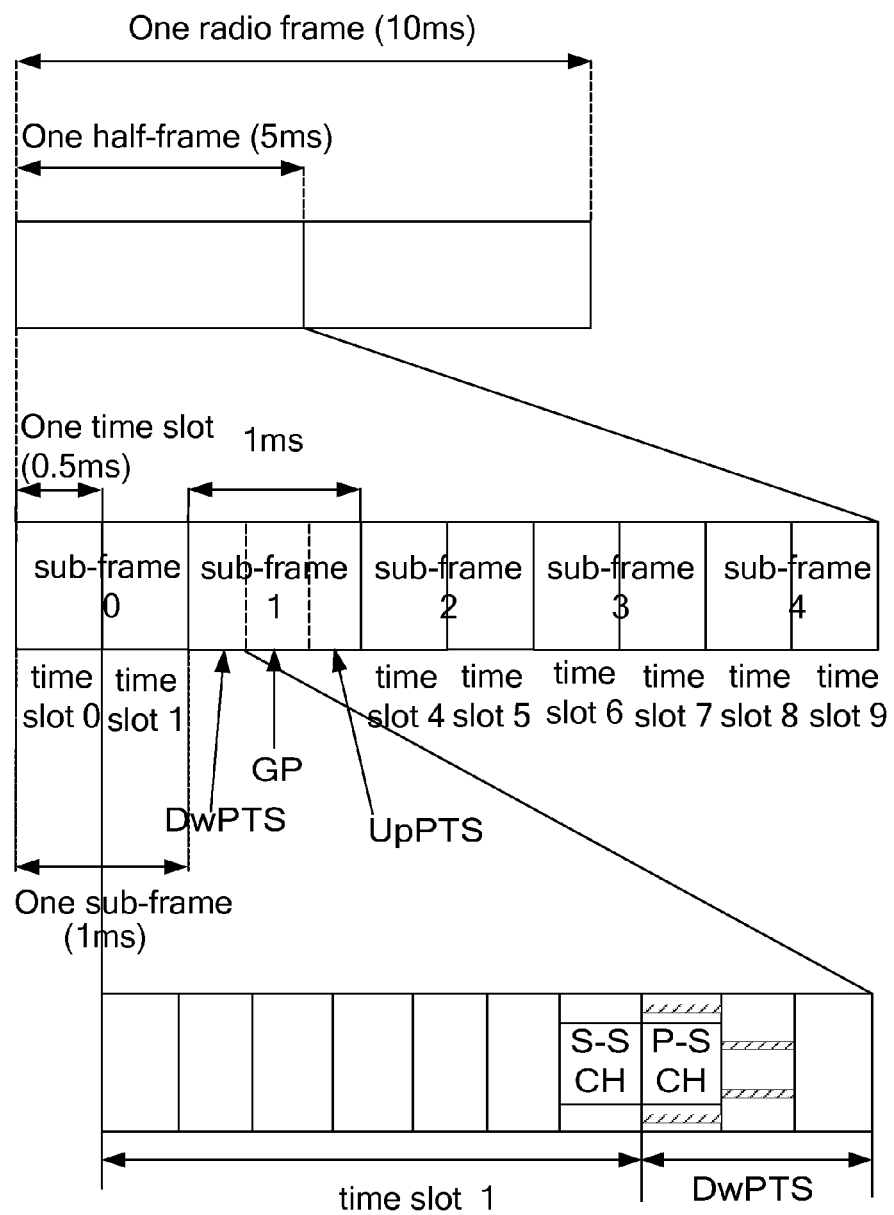
FIG. 4 is another specific embodiment of the physical downlink control channel in the present invention.

FIG. 4 is another specific embodiment of sending the PDCCH signals in the present invention. In the LTE system, one radio frame of length 10 ms is divided into two half-frames, each half-frame is divided into 10 time slots with a length of 0.5 ms respectively, two time slots constitute one subframe with a length of 1 ms, one radio frame contains 10 subframes (numbered from 0 to 9), and one radio frame contains 20 time slots (numbered from 0 to 19). In the normal cyclic prefix, one subframe contains 14 OFDM symbols; suppose that the DwPTS contains 3 OFDM symbols, the uplink/downlink switch period is 5 ms, the BS transmits the primary synchronization signals on the first OFDM symbol in the DwPTS, the number of the OFDM symbols used for transmitting the PDCCH signals is 2, the BS transmits the PDCCH signals on the first OFDM symbol and second OFDM symbol in the DwPTS, and the primary synchronization signals and PDCCH signals are transmitted in different subcarriers on the first OFDM symbol in the DwPTS.

Figure 5:
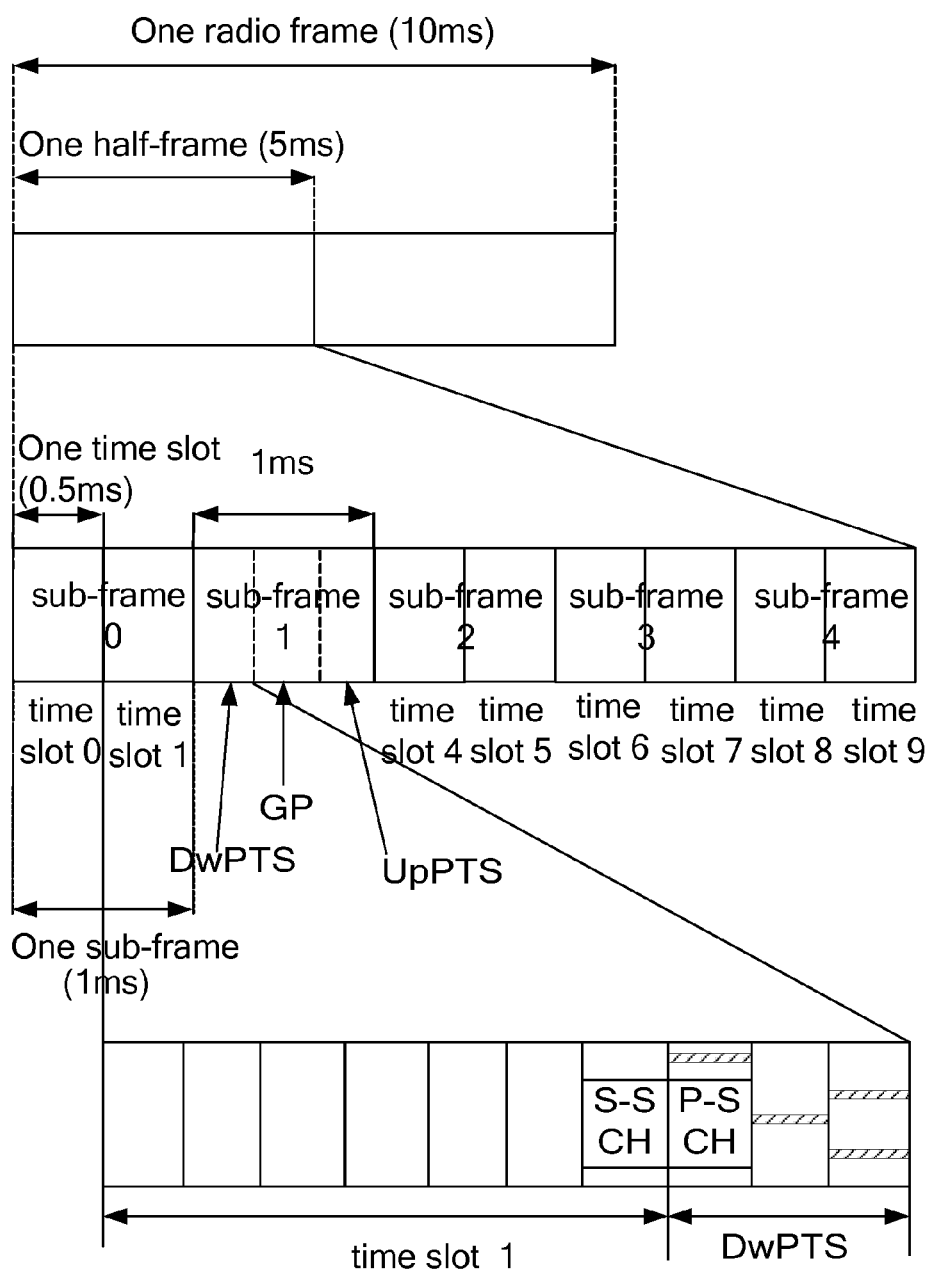
FIG. 5 is another specific embodiment of the physical downlink control channel in the present invention.

FIG. 5 is another specific embodiment of sending the PDCCH signals in the present invention. In the LTE system, one radio frame of length 10 ms is divided into two half-frames, each half-frame is divided into 10 time slots with a length of 0.5 ms respectively, two time slots constitute one subframe with a length of 1 ms, one radio frame contains 10 subframes (numbered from 0 to 9), and one radio frame contains 20 time slots (numbered from 0 to 19). In the normal cyclic prefix, one subframe contains 14 OFDM symbols; suppose that the DwPTS contains 3 OFDM symbols, the uplink/downlink switch period is 5 ms, the BS transmits the primary synchronization signals on the first OFDM symbol in the DwPTS, the number of the OFDM symbols used for transmitting the PDCCH signals is 3, the BS transmits the PDCCH signals on the first OFDM symbol, the second OFDM symbol and the third OFDM symbol in the DwPTS, and the primary synchronization signals and the PDCCH signals are transmitted in different subcarriers on the first OFDM symbol in the DwPTS.

Figure 6:
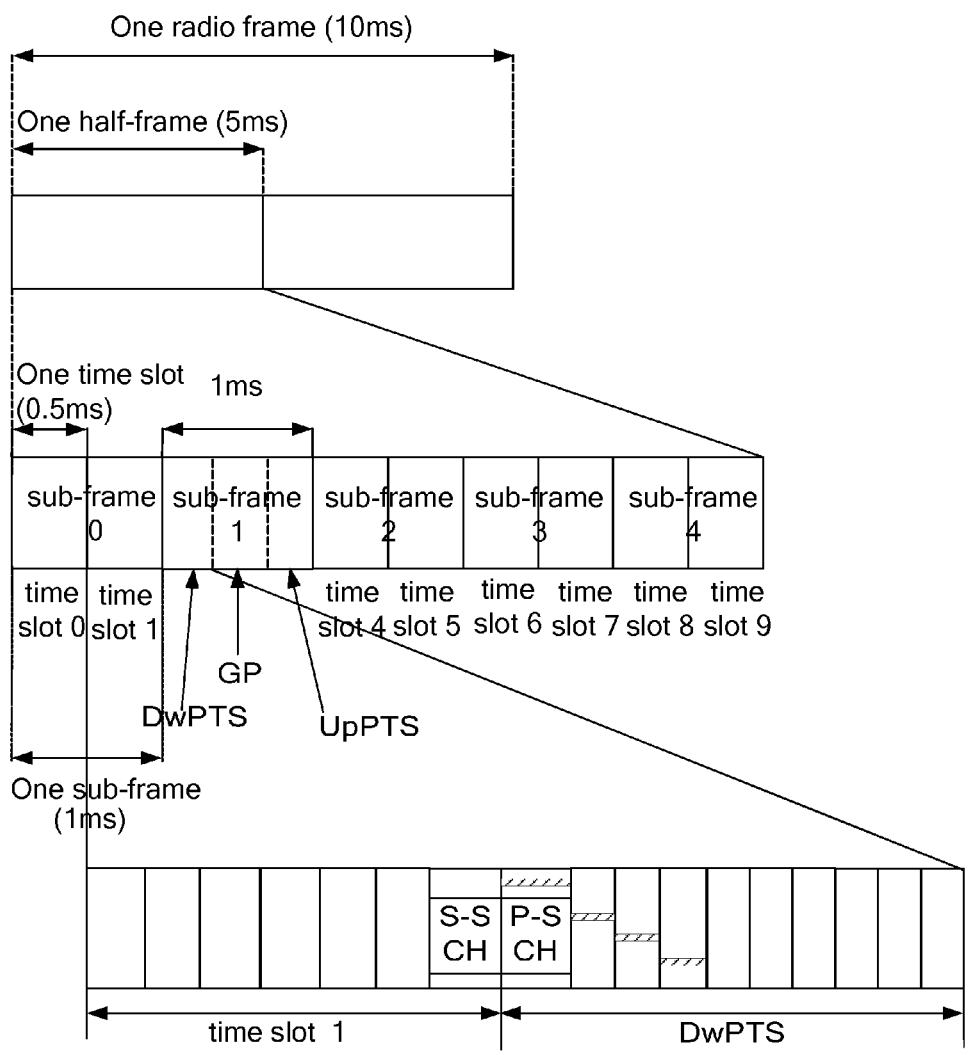
FIG. 6 is another specific embodiment of the physical downlink control channel in the present invention.

FIG. 6 is another specific embodiment of sending the PDCCH signals in the present invention. In the LTE system, one radio frame of length 10 ms is divided into two half-frames, each half-frame is divided into 10 time slots with a length of 0.5 ms respectively, two time slots constitute one subframe with a length of 1 ms, one radio frame contains 10 subframes (numbered from 0 to 9), and one radio frame contains 20 time slots (numbered from 0 to 19). In the normal cyclic prefix, one subframe contains 14 OFDM symbols; suppose that the DwPTS contains 10 OFDM symbols, the uplink/downlink switch period is 5 ms, the BS transmits the primary synchronization signals on the first OFDM symbol in the DwPTS, when the ratio of uplink time slot to the downlink time slot is 3:1, the number of the OFDM symbols used for transmitting the PDCCH signals is 4, the BS transmits the PDCCH signals on the first OFDM symbol, the second OFDM symbol, the third OFDM symbol and the fourth OFDM symbol in the DwPTS, and the primary synchronization signals and the PDCCH signals are transmitted in different subcarriers on the first OFDM symbol in the DwPTS.

It should be noted that the above methods for sending the PDCCH signals can vary on a real time basis for the BS, i.e. for the same BS, sometimes the PDCCH signals may be transmitted on one OFDM symbol, sometimes on 2 OFDM symbols, and sometimes on 3 OFDM symbols; for specific combinations, please see the schemes in the SUMMARY section. When the ratio of the uplink time slot to the downlink time slot at the BS is 3:1, the number of OFDM symbols used for transmitting the physical downlink control channel may be 4. The OFDM symbols and the number of them used for transmitting the physical downlink control channel in the DwPTS are designated by the physical control format indicator channel (PCFICH).

The above description only are the embodiments of the present invention, rather than limit the present invention; as to those technicians skilled in the art, various changes and variations can be made to the present invention, some examples of which have already listed in the SUMMARY section, but the present invention is not limited to the examples as listed in the SUMMARY section. Any modification, equivalent substitution, and improvement, etc, made within the spirit and principle of the present invention shall all be in protection scope of claims of the present invention.

INDUSTRIAL APPLICABILITY

In the present invention, the method for sending PDCCH signals can solve the problem of conflict between the PDCCH and primary synchronization signals in the DwPTS by generating a less delay and less impact on other channels.

What is claimed is:

1. A method for sending physical downlink control channel (PDCCH) signals in downlink pilot time slots, comprising: a base station transmitting PDCCH signals on one or more orthogonal frequency division multiplexing (OFDM) symbols in the downlink pilot time slot, and resources used for transmitting the PDCCH signals being different from resources used for transmitting primary synchronization signals of synchronization signals, wherein the base station transmits the primary synchronization signals on the first OFDM symbol in the downlink pilot time slot, and when the ratio of uplink time slot to the downlink time slot is 3:1, the number of OFDM symbols used by the base station for transmitting the physical downlink control channel in the downlink pilot time slot is 4, the base station transmits the PDCCH signals on the first OFDM symbol, the second OFDM symbol, the third OFDM symbol and the fourth OFDM symbol in the downlink pilot time slot, and the primary synchronization signals and the PDCCH signals are transmitted in different subcarriers on the first OFDM symbol in the DwPTS;

while under other circumstances, the number of OFDM symbols used for transmitting the physical downlink control channel in the downlink pilot time slot is 1, 2 or 3, which is designated by a physical control format indicator channel.

2. The method for sending signals according to claim 1, wherein the method for sending signals is applied in a long term evolution system that is based on a time division duplex mode; in a frame structure of the system, one radio frame of length 10 ms is divided into two half-frames, each half-frame is divided into 10 time slots with a length of 0.5 ms respectively, two time slots constitute one subframe with a length of 1 ms, one radio frame contains 10 subframes that are numbered from 0 to 9, one radio frame contains 20 time slots that are numbered from 0 to 19, and the downlink pilot time slot is located in subframe 1 and subframe 6.

* * * * *